United States Patent
Graci et al.

(10) Patent No.: US 12,449,100 B2
(45) Date of Patent: Oct. 21, 2025

(54) PRESSURE VESSEL ASSEMBLY AND PRESSURE VESSEL SYSTEM

(71) Applicant: Bayerische Motoren Werke Aktiengesellschaft, Munich (DE)

(72) Inventors: Lydia Moral Graci, Munich (DE); Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 10 days.

(21) Appl. No.: 17/797,945

(22) PCT Filed: Feb. 4, 2021

(86) PCT No.: PCT/EP2021/052635
§ 371 (c)(1),
(2) Date: Aug. 5, 2022

(87) PCT Pub. No.: WO2021/156349
PCT Pub. Date: Aug. 12, 2021

(65) Prior Publication Data
US 2023/0053395 A1 Feb. 23, 2023

(30) Foreign Application Priority Data
Feb. 7, 2020 (DE) .................. 10 2020 103 155.6

(51) Int. Cl.
*F17C 13/08* (2006.01)
*F17C 13/04* (2006.01)

(52) U.S. Cl.
CPC ............ *F17C 13/084* (2013.01); *F17C 13/04* (2013.01); *F17C 2205/0142* (2013.01);
(Continued)

(58) Field of Classification Search
CPC ................... F17C 13/084; F17C 13/04; F17C 2205/0146; F17C 2205/0142;
(Continued)

(56) References Cited

U.S. PATENT DOCUMENTS

| | | | | |
|---|---|---|---|---|
| 3,029,981 A | * | 4/1962 | Webster | .................... F17C 1/00 116/DIG. 44 |
| 3,886,885 A | * | 6/1975 | Becker | .................... F17C 1/002 220/560.12 |

(Continued)

FOREIGN PATENT DOCUMENTS

| CN | 207455176 U | 6/2018 |
|---|---|---|
| CN | 109538933 A | 3/2019 |

(Continued)

OTHER PUBLICATIONS

Chinese-language Office Action issued in Chinese Application No. 202180012721.2 dated Apr. 14, 2023 with English translation (17 pages).

(Continued)

*Primary Examiner* — Reinaldo Sanchez-Medina
(74) *Attorney, Agent, or Firm* — Crowell & Moring LLP (57) ABSTRACT

A pressure vessel arrangement includes a plurality of pressure vessels configured to store fuel, and a valve arrangement with at least one valve and a plurality of tank connectors. In the pressure vessel arrangement each pressure vessel of the plurality of pressure vessels is connected to one of the tank connectors. Further, in the pressure vessel arrangement the valve arrangement connects the tank connectors directly to one another and to the at least one valve, such that a fluid exchange which is not impaired at any time by way of a valve is brought about between the individual pressure vessels.

12 Claims, 9 Drawing Sheets

(52) U.S. Cl.
CPC ............... *F17C 2205/0326* (2013.01); *F17C 2205/0329* (2013.01); *F17C 2205/0332* (2013.01); *F17C 2205/0335* (2013.01); *F17C 2205/0388* (2013.01); *F17C 2250/0439* (2013.01)

(58) Field of Classification Search
CPC ..... F17C 2205/0323; F17C 2205/0326; Y10T 137/4857; Y10T 137/4874
See application file for complete search history.

(56) References Cited

U.S. PATENT DOCUMENTS

| | | | | |
|---|---|---|---|---|
| 4,800,923 | A * | 1/1989 | Bartos | A62B 9/00 137/613 |
| 11,933,455 | B2 * | 3/2024 | Icard | F17C 5/00 |
| 11,953,155 | B2 * | 4/2024 | Schaich | F17C 13/123 |
| 12,287,066 | B2 * | 4/2025 | Bartl | F17C 13/123 |
| 2003/0146214 | A1 * | 8/2003 | Idoguchi | F17C 13/04 220/23.83 |
| 2004/0159352 | A1 * | 8/2004 | Friedlmeier | F17C 1/00 137/266 |
| 2007/0056643 | A1 * | 3/2007 | Larsen | F16K 1/305 137/625.42 |
| 2014/0130896 | A1 | 5/2014 | Mayr | |
| 2015/0362383 | A1 * | 12/2015 | Komiya | F17C 13/025 702/99 |
| 2016/0245459 | A1 * | 8/2016 | Grimmer | F17C 5/06 |
| 2017/0321845 | A1 * | 11/2017 | Luparello | F17C 5/06 |
| 2017/0327237 | A1 | 11/2017 | Saini et al. | |
| 2018/0195669 | A1 | 7/2018 | Sawai | |
| 2018/0328540 | A1 | 11/2018 | Hettenkofer | |
| 2019/0047404 | A1 | 2/2019 | Sawai | |
| 2019/0047409 | A1 | 2/2019 | Kataoka et al. | |
| 2019/0091497 | A1 * | 3/2019 | Hansen | A62B 7/02 |

FOREIGN PATENT DOCUMENTS

| | | |
|---|---|---|
| CN | 109812693 A | 5/2019 |
| DE | 10 2009 049 687 A1 | 4/2011 |
| DE | 10 2015 222 252 A1 | 5/2017 |
| DE | 10 2018 000 756 A1 | 1/2019 |
| DE | 10 2017 213 523 A1 | 2/2019 |
| DE | 10 2018 116 090 A1 | 2/2019 |
| EP | 0 666 087 A1 | 8/1995 |

OTHER PUBLICATIONS

International Search Report (PCT/ISA/210) issued in PCT Application No. PCT/EP2021/052635 dated May 11, 2021 with English translation (four (4) pages).

German-language Written Opinion (PCT/ISA/237) issued in PCT Application No. PCT/EP2021/052635 dated May 11, 2021 (five (5) pages).

German-language Search Report issued in German Application No. 10 2020 103 155.6 dated Jan. 4, 2021 with partial English translation (12 pages).

* cited by examiner

PRESSURE VESSEL ASSEMBLY AND PRESSURE VESSEL SYSTEM

BACKGROUND

The technology disclosed herein relates to a pressure vessel arrangement and to a pressure vessel system with a plurality of pressure vessel arrangements.

Pressure vessels can be used in a motor vehicle or in another unit to store gaseous fuel. Here, for example, a plurality of pressure vessels can also be present in a single motor vehicle, for improved utilization of installation spaces for storing gaseous fuel. This can require technically complex constructions.

SUMMARY

It is one preferred object of the technology disclosed herein to reduce or to eliminate at least one disadvantage of a previously known solution, or to propose an alternative solution. In particular, it is one preferred object of the technology disclosed herein to decrease the complexity in the case of the use of a plurality of pressure vessels. Further preferred objects can result from the advantageous effects of the technology disclosed herein. The objects are achieved by way of the subject matter of the embodiments of the present invention.

The technology disclosed herein relates to a pressure vessel arrangement. The pressure vessel arrangement comprises: (i) a plurality of pressure vessels for storing fuel, and (ii) a valve arrangement with at least one valve and a plurality of tank connectors. Each pressure vessel of the plurality of pressure vessels is connected to one of the tank connectors. The valve arrangement connects the tank connectors or the pressure vessels which are connected to them directly to one another and to the at least one valve, in particular fluidically, with the result that a fluid exchange which is not impaired at any time by way of a valve is made possible between the individual pressure vessels.

By way of a pressure vessel arrangement of this type, one valve can be used jointly for a plurality of pressure vessels, with the result that it is no longer necessary to use an independent valve in or on each pressure vessel. Complexity can be saved as a result. The configuration of the valve arrangement for direct connection of the tank connectors achieves a situation where the connected pressure vessels are fundamentally held at an identical pressure. A direct pressure exchange is possible between the connected pressure vessels. In a manner which lies opposite the pressure vessels, the valve can be connected, for example, to lines or connectors for filling or for extracting gaseous fuel. For components which are connected to the valve, the pressure vessels which are connected to the valve arrangement typically behave in such a way as if there were only one pressure vessel. The storage capacity and space utilization can be improved, however, by way of a use of a plurality of pressure vessels in comparison with the use of only one pressure vessel.

The at least one valve of the valve arrangement is coupled mechanically to all the pressure vessels, in particular via the housing disclosed herein.

The at least one valve of the valve arrangement is provided directly adjacently with respect to the pressure vessels; the spacing between the at least one valve of the valve arrangement and that pressure vessel of the pressure vessel arrangement which is furthest away is preferably less than 100 cm or less than 50 cm or less than 20 cm.

For example, two pressure vessels, three pressure vessels or more than three pressure vessels can be used and can be correspondingly connected to respective tank connectors on the valve arrangement. The valve arrangement typically has as many tank connectors as the pressure vessel arrangement has pressure vessels. The connection of a pressure vessel to one of the tank connectors typically takes place in a pressure-tight manner, with the result that no pressure escapes at a connector point at typical operating pressures which can be, for example, up to 700 bar. A direct connection is typically understood to mean an uninterrupted connection, that is to say no further valve or other element which controls or substantially impedes the throughflow is present in a corresponding connection. Therefore, a pressure equalization which is to be considered instantaneous is made possible in typical operating situations.

The valve arrangement can be configured, in particular, as a valve unit. It can expediently be configured in a housing which can afford, for example, mechanical protection or tightness against the escape of gaseous fuel such as, for example, hydrogen. The valve arrangement of valve unit can be considered overall as an On Tank Valve (OTV) which can be used for a plurality of pressure vessels at the same time.

In accordance with one preferred embodiment, each pressure vessel has a connector piece, to which an external thread is applied. A union nut with an internal thread is further preferably attached on each tank connector, which internal thread is screwed to the external thread of the pressure vessel which the tank connector connects to the valve arrangement. An embodiment of this type has proven to be particularly advantageous, in particular has proven to be particularly stable. The union nuts can be screwed with their internal thread onto the external thread of the connector piece, the internal thread and the external thread typically being of complementary configuration with respect to one another. A simple, stable and pressure-tight connection is achieved in this way. It is to be mentioned, however, that the embodiment can also be configured in a reversed manner, that is to say, for example, a union nut with an internal thread which is screwed onto an external thread on a tank connector can be attached to the connector piece.

In accordance with one embodiment, the pressure vessel arrangement has a pressure relief apparatus, a pressure relief apparatus being provided merely on one of the pressure vessels of the pressure vessel arrangement. In the case of the embodiments which are described herein, the attachment of the pressure relief apparatus to only one of the pressure vessels is typically sufficient, since, as has already been mentioned, the pressure vessels are connected fluidically to one another via the valve arrangement. A possible overpressure event would therefore automatically occur at all the pressure vessels at the same time. If there is a pressure relief apparatus on only one of the pressure vessels, this acts for all the pressure vessels and discharges the overpressure from all the pressure vessels. A pressure relief apparatus can be configured, for example, as a pressure relief valve.

In accordance with one preferred embodiment, the pressure vessel arrangement has precisely one temperature sensor for measuring an internal temperature of the pressure vessels. This is based on the finding that the temperature in the pressure vessels is typically equalized on account of the fluidic connection of the pressure vessels via the valve arrangement, to such an extent that a single measurement of the temperature is sufficient. Accordingly, one temperature sensor is also sufficient, as a result of which complexity is saved. As an alternative, however, a plurality of temperature sensors can also be used, it being possible in accordance with one embodiment, for example, for a respective temperature sensor to also be attached on or in each pressure vessel.

The temperature sensor can be provided, in particular, on one of the tank connectors or at a longitudinal end of a pressure vessel, which longitudinal end lies opposite the tank connector. Embodiments of this type have proven to be simple and expedient. In particular, as a result of the attachment to a tank connector, the attachment of the temperature sensor can be integrated into a manufacturing process of the valve arrangement.

The pressure relief apparatus and/or the temperature sensor can be arranged, in particular, in or on an end piece of one pressure vessel of the pressure vessels. An end piece of this type can be manufactured, for example, separately from the rest of the pressure vessel and can then be connected to the pressure vessel, for example by way of being screwed into an opening which is provided for this purpose.

The valve arrangement can have, in particular, a preferably manually switchable first valve, to which the tank connectors are connected. This can be, in particular, the abovementioned valve of the valve arrangement. Manual actuation is made possible by way of the manual switching capability, as a result of which, for example in the case of an inspection or malfunction of electric components, the pressure vessels can be reliably shut off. As an alternative, the first valve might also be of electrically switchable configuration.

The first valve can be connected, in particular, via a preferably electrically switchable second valve to an extraction connector. This makes it possible, for example, to provide electric switching of an extraction of gaseous fuel via the extraction connector in the case of an open first valve. The second valve or, in general, an electrically switchable valve can have, in particular, the functionality of a tank shut-off valve. In particular, it can be normally closed, with the result that a shut-off is ensured, for example, in the case of a power failure.

A tank shut-off valve is, in particular, a valve, the input pressure of which corresponds (substantially) to the vessel pressure. The tank shut-off valve is, in particular, a valve which can be open-loop or closed-loop controlled and, in particular, is normally closed.

Other connections to the extraction connector, for example a direct connection between the first valve or another valve and the extraction connector, are also possible, however.

The first valve can be connected, in particular, via a check valve to a filling connector. It can also be connected, however, in some other way to the filling connector, for example directly. Via a filling connector of this type, gaseous fuel can be introduced into the pressure vessel, with the result that it can be stored and can subsequently be used.

In accordance with one embodiment, the tank connectors can be connected via a check valve to a filling connector. It can be provided here, in particular, that only the check valve is provided between the tank connectors and the filling connector. As a result, filling can take place independently of the abovementioned first valve or other further valves.

The valve arrangement can have a pressure relief apparatus which is connected to the tank connectors. As a result, central pressure relief for all connected pressure vessels can be achieved. This makes a simple embodiment possible.

In accordance with one preferred embodiment, the valve arrangement can have a housing. This housing can delimit the pressure vessel arrangement on the outer side. It can protect the pressure vessel arrangement mechanically. Moreover, it can ensure pressure tightness. These properties can be combined as desired. As a result of the housing, in particular, the valve arrangement can be understood to be a self-contained unit.

Furthermore, the technology disclosed herein relates to a pressure vessel system for a motor vehicle with a plurality of pressure vessel arrangements as described herein. The pressure vessel system can have, in particular, a common filling connector which is connected to filling connectors of the valve arrangements. It can have a common extraction connector which is connected to extraction connectors of the valve arrangements. The principle of the pressure vessel arrangements described further above can be scaled by way of a pressure vessel system of this type, it being possible for a plurality of pressure vessel arrangements of this type to be connected together and to be filled jointly, and it being possible for joint extraction to be performed. All of the embodiments and variants described herein can be drawn upon with regard to the pressure vessel arrangements.

The valve arrangement described herein is functionally independent, and can be considered to be a self-contained aspect of the embodiments of the present invention.

The pressure vessel arrangement serves, in particular, to store fuel which is gaseous under ambient conditions, in particular for a motor vehicle such as a passenger motor car, a motor vehicle or a utility vehicle. The pressure vessel arrangement can be used, for example, in a motor vehicle which is operated using compressed (CNG) or liquefied (LNG) natural gas or using hydrogen. The pressure vessel arrangement is typically connected fluidically to at least one energy converter which is configured to convert the chemical energy of the fuel into other energy forms.

The pressure vessels can be configured, for example, as composite overwrapped pressure vessels. The pressure vessels can be configured, for example, as cryogenic pressure vessels or as high pressure gas vessels. High pressure gas vessels are configured to store fuel at ambient temperatures in the long term at a nominal working pressure (NWP) of at least 350 bar (=positive pressure with respect to atmospheric pressure) or at least 700 bar. A cryogenic pressure vessel is suitable for storing the fuel at the abovementioned operating pressures even at temperatures which lie considerably below the working temperature of the motor vehicle.

The pressure vessels can have, for example, a respective length to diameter ratio with a value between 5 and 200, preferably between 7 and 100, and particularly preferably between 9 and 50. The length to diameter ratio is the quotient of the length of the pressure vessel in the numerator and the external diameter of the pressure vessel in the denominator. The pressure vessels are expediently arranged parallel to one another and/or are connected fluidically to one another at their ends. As a result, for example, a free-form tank can be realized, by way of which a particularly satisfactory utilization of installation space is possible. For example, a plurality of pressure vessels with the above-specified length to diameter ratio can advantageously be arranged in an underfloor installation space of a motor vehicle.

The pressure vessels can comprise, for example, a respective liner which ensures a particularly low permeability. Liner-less pressure vessels can also be provided, however.

That valve of the valve arrangement which has already been mentioned further above can act, for example, as a tank shut-off valve. Its inlet pressure typically corresponds substantially to the vessel internal pressure of the pressure vessels. A tank shut-off valve of this type can be configured, for example, such that it can be open-loop controlled, closed-loop controlled and/or is normally closed.

A pressure relief apparatus or a pressure relief valve can serve, for example, to discharge fuel. It can be, for example, an apparatus which can be activated and closed again by way of the pressure in the pressure vessels. As a result, an incremental escape of fuel into the surrounding area or into a vehicle-external collecting device can be provided. A collecting device of this type can be used, for example, in the case of a service. What is known as a blow-off management system or boil-off management system (BMS in the following text) can be used, for example, connected downstream of a pressure relief valve or a pressure relief apparatus. A BMS can have a catalytic converter which synthesizes fuel (for example, hydrogen) with oxygen from the ambient air to form water. A pressure relief valve preferably opens as soon as the pressure in the pressure vessels lies somewhat above the maximum operating pressure, for example 10% above the maximum operating pressure.

The pressure relief apparatus can be a thermally activatable pressure relief device. The thermally activatable pressure relief device (also called Thermal Pressure Relief Device (=TPRD) or thermal fuse) is as a rule provided adjacently with respect to the pressure vessel. In the case of the action of heat (for example, by way of flames), the fuel which is stored in the pressure vessel is discharged into the surrounding area by way of the TPRD. The pressure relief device discharges the fuel as soon as the triggering temperature of the TPRD is exceeded (=is activated thermally). Furthermore, triggering lines can be provided. A system of this type for thermal pressure relief is disclosed, for example, in the German patent application with the publication number DE 10 2015222252 A1.

Each tank connector can have, for example, an injector, in order to introduce hydrogen or another gas into the tank. It can be provided here, in particular, that the injector gives the gas a preferred direction, that is to say is angled away, for example, in comparison with the longitudinal extent of the tank. As a result, turbulence can be triggered, and undesired temperature distributions can be avoided.

The technology disclosed herein will now be explained on the basis of the figures, in which:

DETAILED DESCRIPTION

Figure 1:
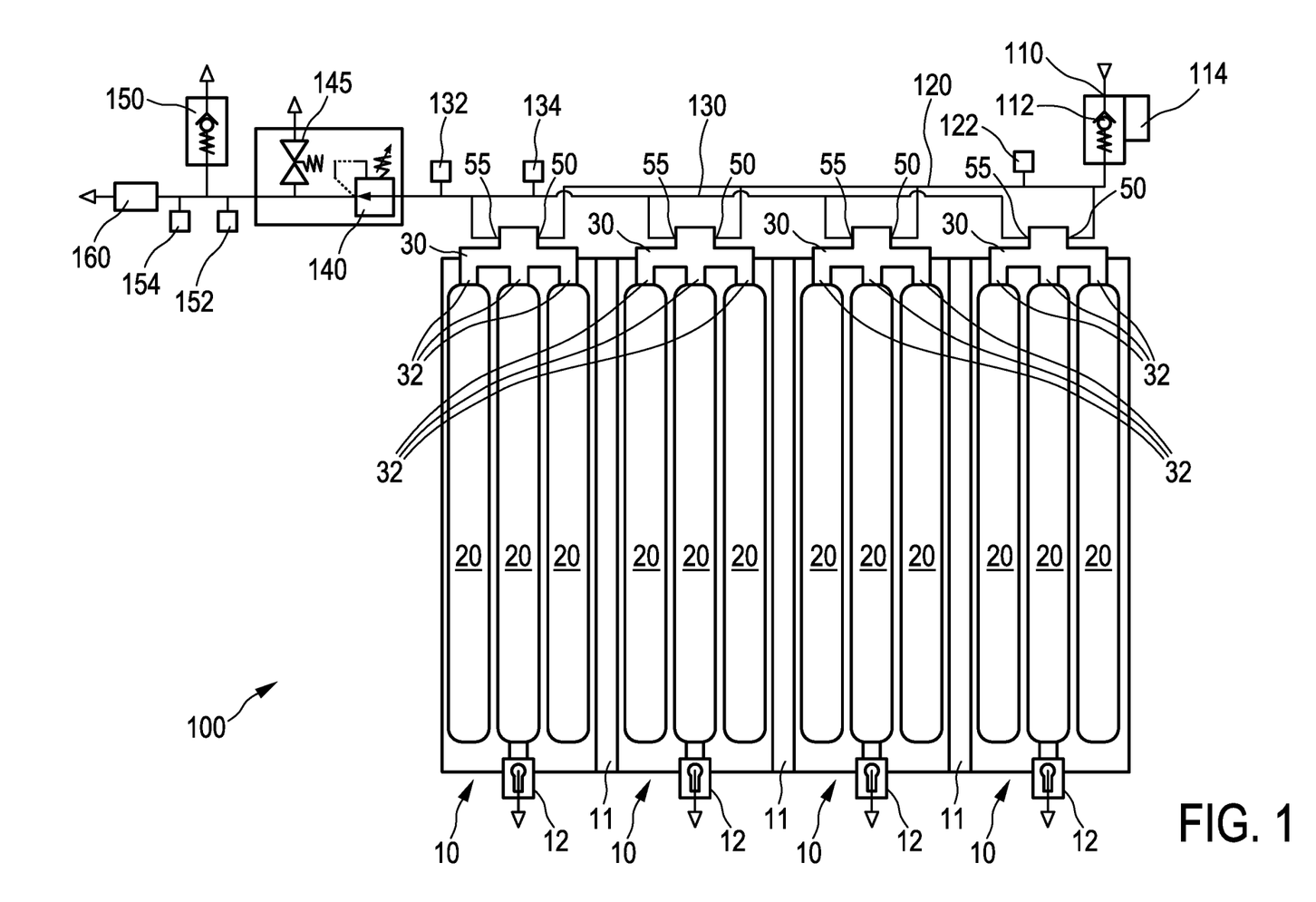
FIG. 1 shows a diagrammatic pressure vessel system.

FIG. 1 purely diagrammatically shows a pressure vessel system 100 in accordance with one embodiment. The pressure vessel system 100 has a total of four pressure vessel arrangements 10, in each case three pressure vessels 20 being provided per pressure vessel arrangement 10. Therefore, a total of twelve pressure vessels 20 are provided. It is to be understood, however, that any other number of pressure vessel arrangements 10 and/or any other number of pressure vessels 20 per pressure vessel arrangement 10 can fundamentally also be used. It can also be provided that the pressure vessel arrangements 10 of the pressure vessel system 100 have respective different numbers of pressure vessels 20. Diagrammatically shown crossmembers 11 which serve to stabilize a vehicle body (not shown) are arranged between the pressure vessel arrangements 10.

The pressure vessels 20 are configured parallel to one another here, which represents one possible embodiment, but not the only possible embodiment.

The pressure vessel system 100 has a common filling connector 110. The latter is connected via a check valve 112 to a filling line 120. An infrared interface 114 which serves for communication with a filling station is also arranged on the common filling connector 110. A pressure sensor 122 which can measure the pressure in the filling line 120 is connected to the filling line 120.

Each of the pressure vessel arrangements 10 has a respective valve arrangement 30. In the present case, each valve arrangement 30 has three tank connectors 32, a respective pressure vessel 20 being connected to each of the tank connectors 32. Furthermore, each valve arrangement 30 has a filling connector 50 which is connected to the abovementioned filling line 120.

Furthermore, each valve arrangement 30 has an extraction connector 55. An extraction line 130 is connected to the extraction connectors 55, which extraction line 130 can be used jointly for the removal of gaseous fuel from the pressure vessels 20. A pressure sensor 132 is connected to the extraction line 130, in order to measure the pressure in the extraction line 130. Moreover, a temperature sensor 134 is connected to it.

The extraction line 130 leads to a pressure reducer 140 which can decrease a pressure in the extraction line 130 to a defined outlet pressure. A pressure relief valve 145, a check valve 150 for connection to a final filling device, and a pressure sensor 152 and a temperature sensor 154 are connected on the low pressure side of this pressure reducer. Finally, a common extraction connector 160 is connected to it, to which extraction connector 160 a consumer for the gaseous fuel which is stored in the pressure vessels 20 can be connected. A consumer of this type can be, for example, a fuel cell system or a gas-operated engine.

Each pressure vessel arrangement 10 has a pressure relief apparatus 12 which, in the present case, is connected to the respective middle one of the in each case three pressure vessels 20. As a result, an excessively high pressure which is possibly situated in the pressure vessels 20 can be discharged.

In the case of each of the pressure vessel arrangements 10, the valve arrangement 30 ensures that the pressure vessels 20 are connected fluidically to one another, with the result that a largely undelayed pressure equalization is possible between them. It can therefore be assumed that the same internal pressure prevails in all pressure vessels 20 of a pressure vessel arrangement 10. Moreover, the valve arrangement 30 connects the pressure vessels 20, which are connected to it, to the filling connector 50 and the extraction connector 55 in a way which is still to be described. As a result, it is possible for the three pressure vessels 20 of each pressure vessel arrangement 10 to be filled jointly and for gas to be extracted jointly. Furthermore, one pressure relief apparatus 12 per pressure vessel arrangement 10 is sufficient on account of the described functionality of the fluidic connection of the pressure vessels 20 via the valve arrangement 30, since it can be assumed that an overpressure event would exist in an identical way in the case of all three pressure vessels 20, and a discharge of the excessively high pressure by way of a pressure relief apparatus 12 at one of the pressure vessels 20 would also be sufficient, since the pressure relief then acts for all the pressure vessels 20 of the pressure vessel arrangement 10.

Therefore, as a result of the described pressure vessel system 100, gaseous fuel can be stored in a total of twelve pressure vessels 20 which are grouped into four pressure vessel arrangements 10 of in each case three pressure vessels 20. They can be filled jointly by the joint filling connector 110, and gaseous fuel which is stored therein can be extracted jointly via the common extraction connector 160. As a result of the use of the valve arrangements 30, the installation of a respective separate valve (typically called an On Tank Valve (OTV)) into each of the pressure vessels 20 can be dispensed with. Complexity is saved as a result.

Figure 2:
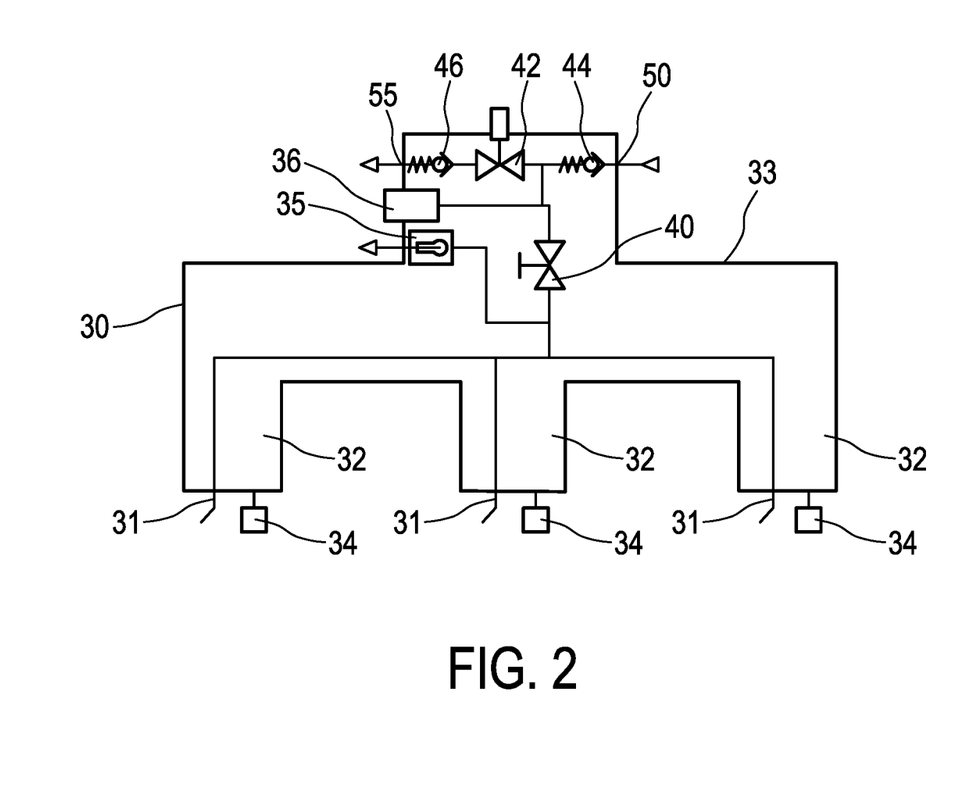
FIG. 2 shows a diagrammatic valve arrangement.

FIG. 2 shows a valve arrangement 30 in a diagrammatic view including internal circuitry. As has already been mentioned, the valve arrangement 30 has three tank connectors 32, to which the pressure vessels 20 are connected.

The valve arrangement 30 is enclosed by a housing 33 which ensures mechanical protection and pressure tightness.

A respective injector 31 is configured on each tank connector 32. The injector 31 extends into the respective pressure tank 20 and ensures that inflowing gas is injected with a preferred direction. As a result, turbulence can be achieved, as a result of which undesired temperature distributions can be avoided. Furthermore, a respective temperature sensor 34 is arranged on each of the tank connectors 32, which temperature sensor 34 likewise extends into the respective connected pressure vessel 20, in order to measure its temperature in the interior space.

As shown, the injectors 31 are connected to one another without there being an element which prevents or controls throughflow between the injectors 31. As a result, a direct pressure equalization between the pressure tanks 20 is made possible, with the result that it can be assumed that they have fundamentally the same internal pressure. Furthermore, the injectors 31 are connected to a first valve 40 which can be actuated manually. As a result, a manual shut-off or release of a filling operation and an extraction are made possible. Furthermore, the injectors 31 are connected directly to a pressure relief apparatus 35 in the form of a pressure release valve, by way of which a safety functionality is provided, since any possible overpressure in the pressure vessels 20 can be discharged. In a manner which lies opposite the injectors 31, the first valve 40 is connected to an electrically actuated second valve 42. The latter in turn is connected via a check valve 46 to the abovementioned extraction connector 55. Furthermore, the first valve 40 is connected via a check valve 44 to the abovementioned filling connector 50. These connections make filling and extraction possible, it being possible for the extraction to be electrically shut off specifically by way of the second valve 42. As a result, the extraction can be prevented without a manual actuation of the first valve 40 being required. Furthermore, the first valve 40 is connected to a connector stub 36 which makes the connection of further components possible, which connector stub 36 is closed during normal operation, however.

Figure 3:
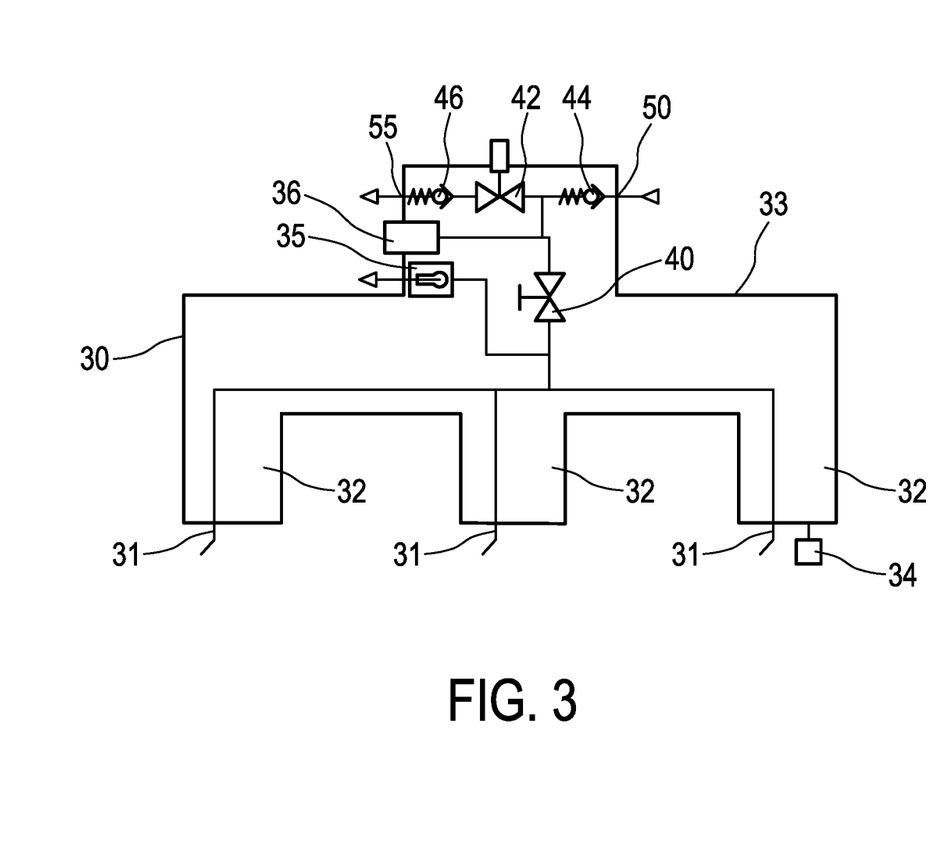
FIG. 3 shows a further diagrammatic valve arrangement.

FIG. 3 shows a valve arrangement 30 in accordance with a further possible embodiment. Here, in contrast to the embodiment of FIG. 2, three temperature sensors 34 are not arranged, but rather merely a single temperature sensor 34. It has been shown that, in the case of the embodiment which is shown in which the injectors 31 are connected directly to one another and therefore a direct pressure equalization is made possible between the pressure vessels 20, the use of a single temperature sensor 34 is typically sufficient, since the same internal temperature prevails in any case in the pressure vessels 20. Two temperature sensors can therefore be saved in the case of the embodiment which is shown. The tank connectors 32 without a temperature sensor can correspondingly be configured with a smaller diameter.

Figure 4:
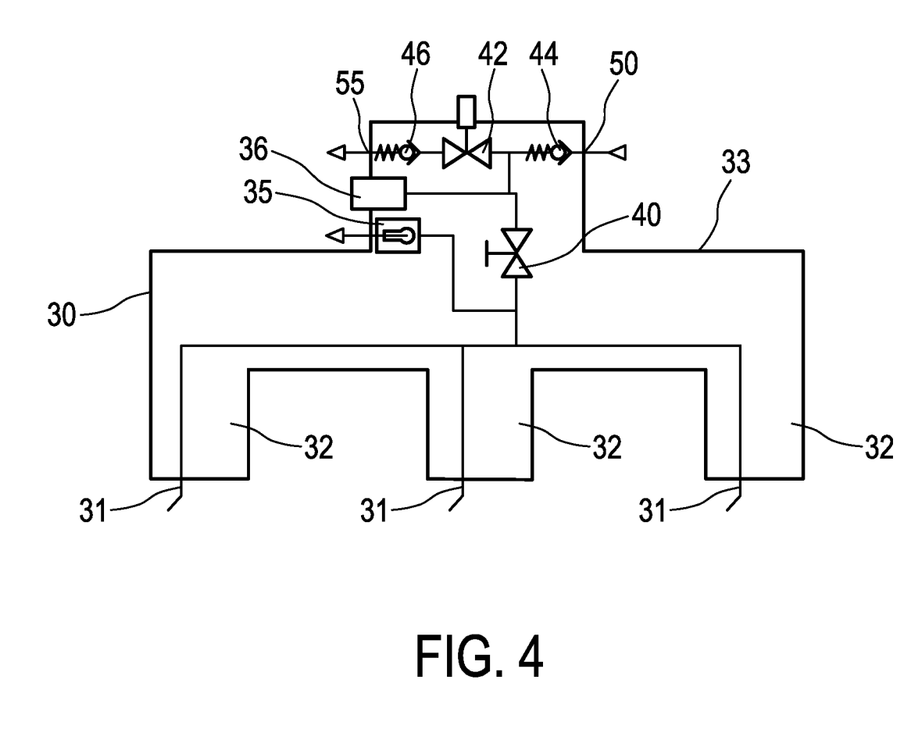
FIG. 4 shows a further diagrammatic valve arrangement.

FIG. 4 shows a valve arrangement 30 in accordance with a further embodiment, no temperature sensor at all being present any longer on the valve arrangement 30 in contrast to the embodiments of FIGS. 2 and 3. An embodiment of this type can be advantageously used, in particular, if a temperature sensor is attached at another location in one of the connected pressure vessels 20, as will be described further below. All the tank connectors 32 can then be configured with a smaller diameter.

The pressure relief apparatus 35 of the valve arrangement 30 can fundamentally be dispensed with, in particular if the corresponding functionality is taken over by the abovementioned pressure relief apparatus 12 in a manner which lies opposite the valve arrangement 30.

Figure 5:
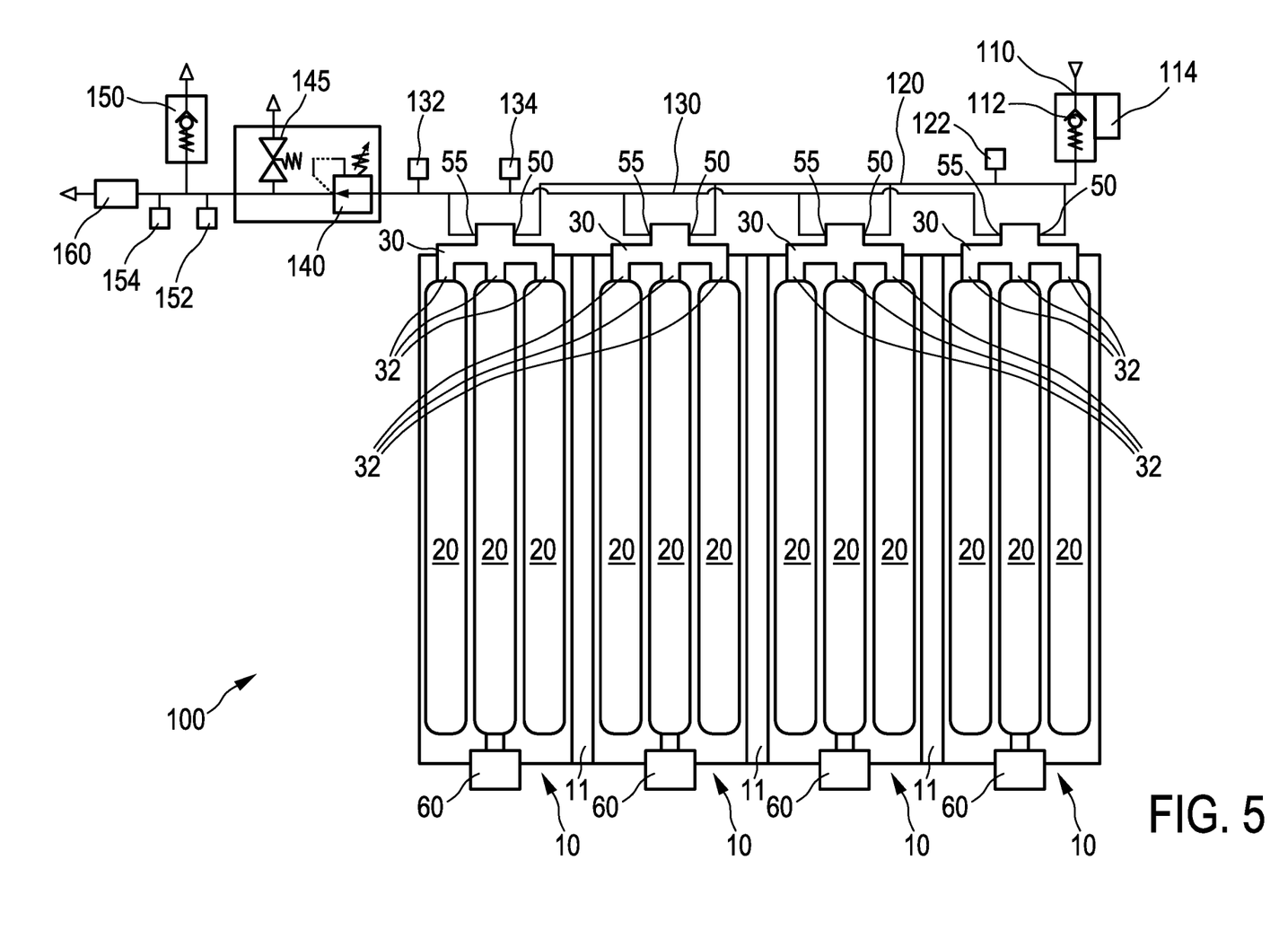
FIG. 5 shows a further diagrammatic pressure vessel system.
Figure 6:
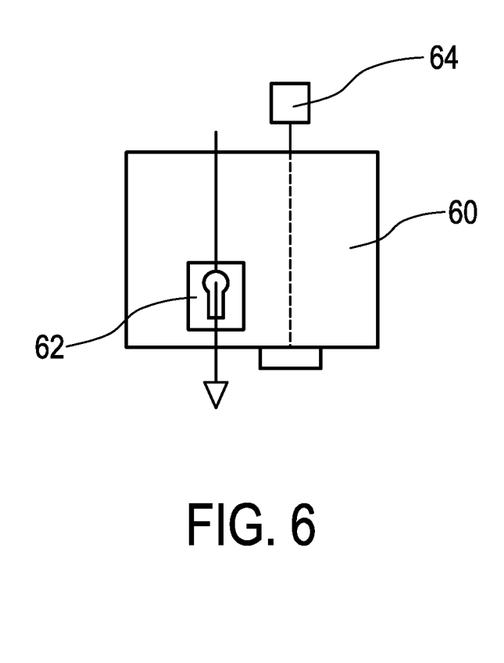
FIG. 6 shows a diagrammatic end piece.

FIG. 5 shows a pressure vessel system 100 in accordance with an alternative embodiment in comparison with FIG. 1, each pressure vessel arrangement 10 having a respective end piece 60 instead of the respective pressure relief apparatus 12 in contrast to the embodiment of FIG. 1. The end piece 60 is arranged on one of the three pressure vessels 20 of each pressure vessel arrangement 100 and is screwed into an opening of this pressure vessel 20. The end piece 60 is shown in greater detail in FIG. 6. It can be seen here that the end piece 60 has a pressure relief apparatus 62 and a temperature sensor 64. The internal temperature of the pressure vessel 20 and therefore also the internal pressure of the other pressure vessels 20 which are connected to the valve arrangement 30 can be measured by way of the temperature sensor 64. Furthermore, a possible overpressure can be discharged from the pressure vessels 20 by way of the pressure relief apparatus 62. By means of an embodiment of this type, for example, the tank connectors 32 of the valve arrangement 30 can be configured with a smaller diameter, since the temperature sensor no longer has to be installed on the valve arrangement 30.

Figure 7:
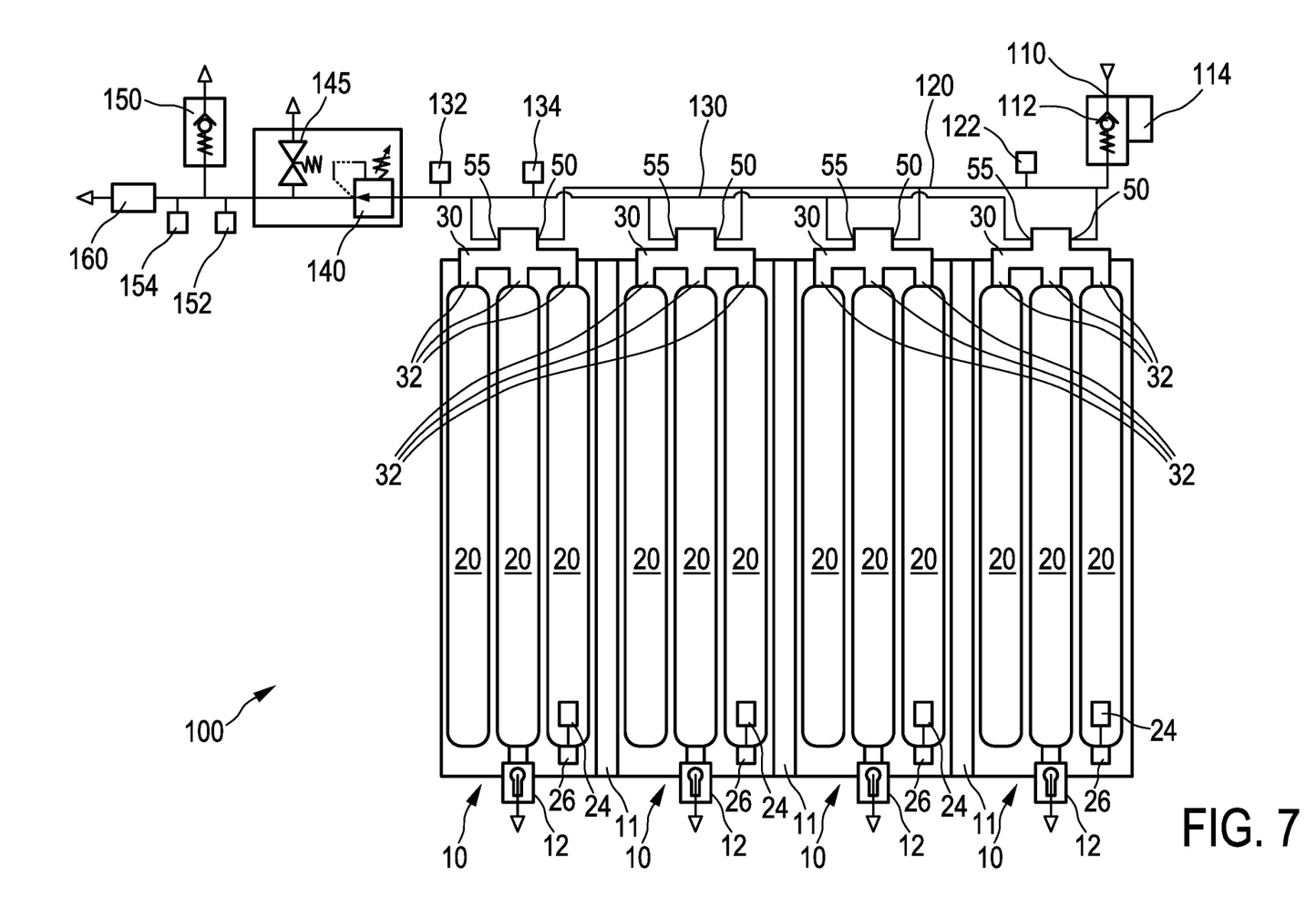
FIG. 7 shows a further diagrammatic pressure vessel system.

FIG. 7 shows another alternative embodiment of a pressure vessel system 100, a pressure relief apparatus 12 being provided on a pressure vessel 20 of each pressure vessel arrangement 10 in contrast to the embodiment of FIG. 5, and a temperature sensor 24 which is fastened to a connecting element 26 being provided on another pressure vessel 20. This can achieve a situation where the diameter of respective openings for fastening the end piece 60 is also decreased in comparison with the embodiment of FIGS. 5 and 6, since the components can be split up over two pressure vessels 20.

Figure 8:
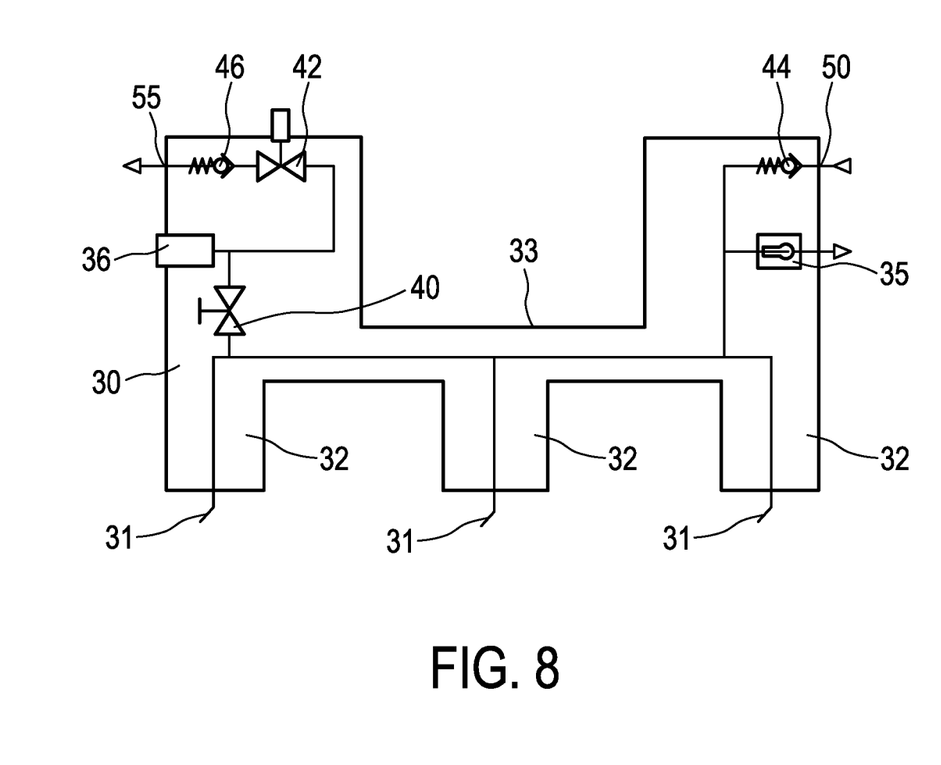
FIG. 8 shows a further diagrammatic valve arrangement.

FIG. 8 shows a valve arrangement 30 in accordance with one alternative embodiment. Here, in contrast to the embodiments of FIGS. 2 to 4, the filling side and the extraction side are configured more independently of one another. In particular, the filling connector 50 is connected via the check valve 44 directly to the injectors 31, with the result that a filling path does not run via the first valve 40 as in the case of the embodiments of FIGS. 2 to 4. Apart from the connection to the filling connector 50, the first valve 40 is interconnected in an equivalent manner to the embodiments of FIGS. 2 to 4.

Figure 9:
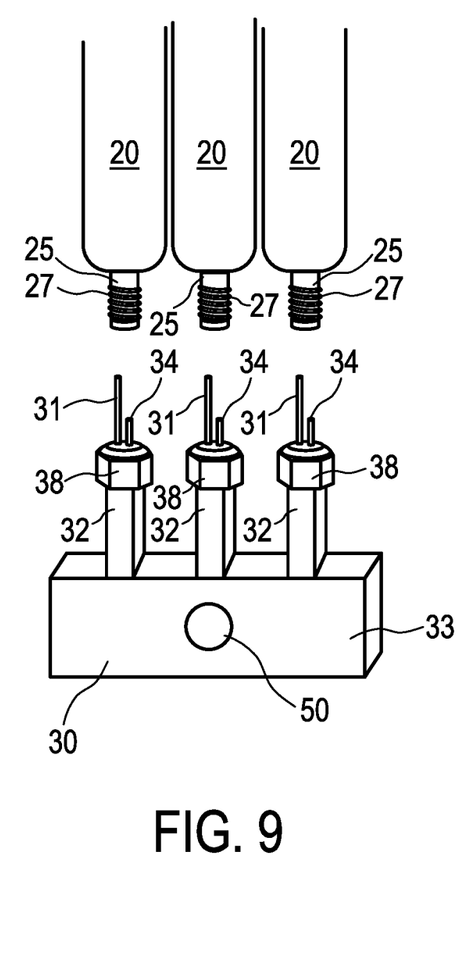
FIG. 9 shows a further diagrammatic valve arrangement.

FIG. 9 shows a valve arrangement 30 in a more geometrically detailed embodiment, and pressure vessels 20 which are to be fastened to it.

Each pressure vessel 20 has a connector piece 25 with an external thread 27 which is attached to it. Each tank connector 32 of the valve arrangement 30 has a union nut 38 with an internal thread which is configured in it and cannot be seen in FIG. 9. The injector 31 and the temperature sensor 34 are arranged in such a way that they protrude into the pressure vessel 20 when the connector piece 25 is pushed toward the tank connector 32 and is brought into engagement with the latter. A fixed connection can then be established by means of the union nut 38, by the union nut 38 being screwed with its abovementioned internal thread onto the external thread 27 of the connector piece 25. The embodiment which is shown makes a long-term and pressure-tight connection which is simple to establish between the valve arrangement 30 and the pressure vessels 20 possible, and can likewise be used for other embodiments of the valve arrangement 30, for example with fewer temperature sensors or with no temperature sensor 34.

For reasons of legibility, the expression "at least one" has been omitted partially for simplification purposes. If the feature of the technology disclosed herein is described in the singular or with the indefinite article (for example, the/a pressure vessel, the/a valve, etc.), a plurality of thereof is intended to also be disclosed at the same time (for example, the at least one pressure vessel, the at least one valve, etc.).

The preceding description of the embodiments of the present invention serves merely for illustrative purposes and not for the purpose of restricting the embodiments of the present invention. Within the context of the invention, various amendments and modifications are possible, without departing from the scope of the embodiments of the present invention and its equivalents.

LIST OF DESIGNATIONS

10 Pressure vessel arrangement
11 Crossmember
12 Pressure relief apparatus
20 Pressure vessel
24 Temperature sensor
25 Connector piece
26 Connector element
27 External thread
30 Valve arrangement
31 Injector
32 Tank connector
33 Housing
34 Temperature sensor
35 Pressure relief apparatus
36 Connector stub
38 Union nut
40 First valve
42 Second valve
44 Check valve
46 Check valve
50 Filling connector
55 Extraction connector
60 End piece
62 Pressure relief apparatus
64 Temperature sensor
100 Pressure vessel system
110 Common filling connector
112 Check valve
114 Infrared interface
120 Filling line
122 Pressure sensor
130 Extraction line
132 Pressure sensor
134 Temperature sensor
140 Pressure reducer
145 Pressure relief valve
150 Check valve
152 Pressure sensor
154 Temperature sensor
160 Common extraction connector

The invention claimed is:

1. A pressure vessel arrangement, comprising:
a plurality of pressure vessels configured to store fuel;
an external pressure relief apparatus that is disposed outside of the plurality of pressure vessels; and
a valve arrangement with at least one valve and a plurality of tank connectors, wherein
each pressure vessel of the plurality of pressure vessels is connected to one of the tank connectors; and
the valve arrangement connects the tank connectors directly to one another and to the at least one valve, such that a fluid exchange between the individual pressure vessels takes place directly and without a valve, wherein
at a first axial end of the plurality of pressure vessels each pressure vessel is directly connected to the valve arrangement, and
at a second axial end of the plurality of pressure vessels that is opposite to the first axial end only one of the plurality of pressure vessels is directly connected to the external pressure relief apparatus.

2. The pressure vessel arrangement according to claim 1, wherein
each pressure vessel has a connector piece, to which an external thread is applied, a union nut with an internal thread is attached on each tank connector,
the internal thread is screwed to the external thread of the pressure vessel, and
the tank connector is connected to the valve arrangement.

3. The pressure vessel arrangement according to claim 1, further comprising:
a temperature sensor that is provided on one of the tank connectors or at the first axial end of the plurality of pressure vessels, and
the second axial end of the plurality of pressure vessels lies opposite the tank connector.

4. The pressure vessel arrangement according to claim 3, wherein
the valve arrangement has a manually switchable first valve, and
the manually switchable first valve is connected to the tank connectors.

5. The pressure vessel arrangement according to claim 4, wherein
the first valve is connected via an electrically switchable second valve to an extraction connector.

6. The pressure vessel arrangement according to claim 5, wherein
the second valve is closed in a normal state.

7. The pressure vessel arrangement according to claim 6, wherein
the first valve is connected via a check valve to a filling connector.

8. The pressure vessel arrangement according to claim 7, wherein
the tank connectors are connected via the check valve to the filling connector.

9. The pressure vessel arrangement according to claim 8, wherein the pressure vessel arrangement has a housing which delimits and mechanically protects the pressure vessel arrangement on the outer side and ensures pressure tightness.

10. The pressure vessel arrangement according to claim 1, further comprising:
a crossmember that is configured to stabilize a vehicle body and that is arranged different groups of the plurality of pressure vessels.

11. A pressure vessel system for a motor vehicle, comprising:
a plurality of pressure vessel arrangement according to claim 1.

12. The pressure vessel system according to claim 11, further comprising:
a common filling connector which is connected to the filling connectors of the valve arrangements; and
a common extraction connector which is connected to extraction connectors of the valve arrangements.

* * * * *